Jan. 7, 1964 C. FAHL 3,117,243
CIRCUIT ARRANGEMENT FOR DELAYING THE CHARGING OF A CAPACITOR
Filed Jan. 10, 1962
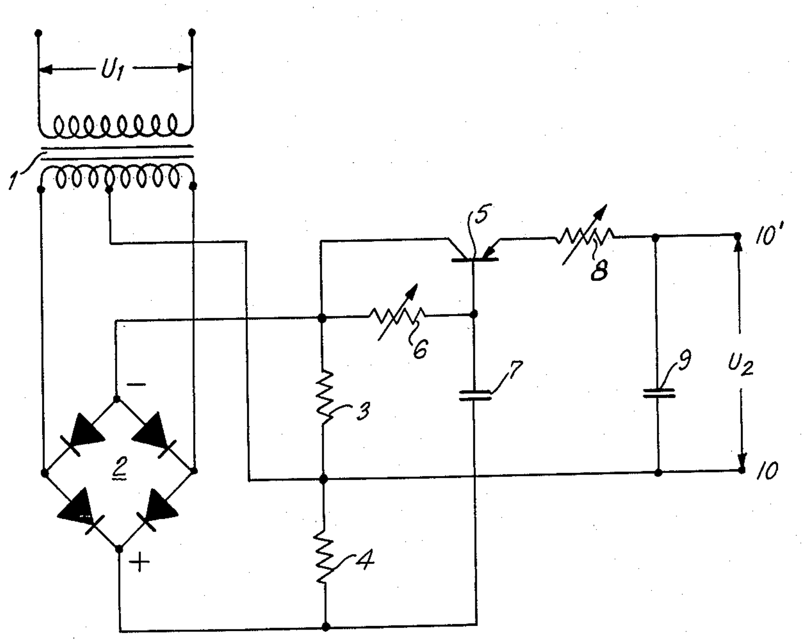
INVENTOR.
Christoph Fahl
BY
Michael S. Striker
Atty United States Patent Office 3,117,243 Patented Jan. 7, 1964

3,117,243

CIRCUIT ARRANGEMENT FOR DELAYING THE CHARGING OF A CAPACITOR

Christoph Fahl, Hannover-Wiesenau, Germany, assignor to Seismos, Gesellschaft mit beschränkter Haftung, Hannover, Germany Filed Jan. 10, 1962, Ser. No. 165,409
5 Claims. (Cl. 307—88.5)

The present invention concerns mainly a circuit arrangement for delaying the charging of a capacitor upon amplitude increase of the charging voltage. More particularly, and preferably, the circuit arrangement according to the invention is intended to produce a delay in the application of a direct current control voltage to the automatic volume control of amplifiers used for recording seismic impulses. The purpose of the arrangement is in such cases to provide for a predetermined delay between the appearance of such impulses at the input of the arrangement, on one hand, and the start of the automatic volume control, on the other hand.

The automatic volume control devices of amplifiers used for seismic recording operate in such a manner that, even if the input amplitude varies corresponding to a variation factor in the range between $10^4$ to $10^6$, the output amplitude is kept practically constant. However, in order to render the arrival of seismic impulses clearly recognizable in a seismic recording, it is required that the automatic volume control operates with a delay so that abrupt changes of the input amplitude are linearly amplified in the amplifier through a time period corresponding to 1 to 2 cycles and consequently appear during this time period in full magnitude at the output of the amplifier.

Known delay circuit arrangements comprise a capacitor which furnishes, depending upon its charge potential, a control signal to the actual volume control means of the amplifier. However, known devices of this kind have the disadvantage that the capacitor potential, although reaching its final value only with a certain delay, nevertheless changes at least to some degree the moment when the input amplitude changes. Consequently, the amplification factor of the seismic recording amplifier having automatic volume control changes immediately when the input amplitude changes. This means that the delay has only the effect that the amplification factor changes more slowly than the input amplitude. An abrupt increase of the input amplitude is not amplified linearly for a time period of 1 to 2 cycles, as is desirable, but the immediately starting, although slow change of the amplification factor of the seismic amplifier has the result that the change of the input amplitude appears immediately at the output of the amplifier, although in a reduced magnitude. This is most undesirable because the seismic recordings are under such circumstances difficult to read, particularly reflected seismic waves are hardly recognizable.

It is therefore among the objects of this invention to provide for a circuit arrangement for delaying the charging of the capacitor which may be used for controlling the automatic volume control arrangement of the amplifier.

It is another object of this invention to provide for a delaying circuit arrangement as set forth in which the charging of the delaying capacitor starts only after a certain delay period after the arrival of a seismic impulse, i.e. after an abrupt increase of the input amplitude.

It is a further object of this invention to provide for an arrangement of the type mentioned above in which the entire delay is composed of two periods; in the first period the direct current potential at the delaying capacitor does not change at all, so that the amplification factor of the amplifier having automatic volume control remains constant for this period and amplifies linearly; in the second period, however, the charging of the delaying capacitor takes place so that its controlling potential increases in such a manner that the automatic volume control starts operating accordingly.

With above objects in view the invention includes a circuit arrangement for delaying the charging of a capacitor upon amplitude increase of the charging voltage, comprising, in combination, input means for introducing a direct current input voltage of predetermined normally constant amplitude but subject to amplitude increases; a main RC-circuit including the capacitor to be charged and having a first charging time constant and conductor means connecting said main RC-circuit with said input means; a secondary RC-circuit having a second charging time constant and including conductor means connecting said secondary RC-circuit with said input means; and circuit control means associated with said conductor means for automatically disconnecting said main RC-circuit from said input means during any increase of said input voltage above said normally constant amplitude until said secondary RC-circuit is charged by said increase of said input voltage, and for automatically connecting said main RC-circuit with said input means while the same furnishes said input voltage at said normally constant amplitude and at any time after said secondary RC-circuit has been charged by said increase of said input voltage, so that said capacitor to be charged is normally charged by and to said input voltage of predetermined normally constant amplitude, but is being charged up to an increased voltage during a time period depending upon said first charging time constant beginning only after said secondary RC-circuit has been charged up to said increased voltage during a time period depending on said second charging time constant.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which a preferred embodiment of the invention is illustrated as a circuit diagram.

As can be seen from the drawing the illustrated arrangement comprises input means including a transformer 1 having a primary winding energized by an input voltage $U_1$ and a split secondary winding, and a full-wave rectifier 2 connected at two of its terminals with the outer ends, respectively, of the secondary winding. A center tap of the secondary winding is connected directly to an output terminal 10 for furnishing a reference voltage which may be 0. The other terminals of the rectifier 2 are taken to the outer ends of a voltage divider arrangement composed of resistors 3 and 4 in series-connection, the junction point between resistors 3 and 4 being also connected with the output terminal 10. The elements of the rectifier 2 are so arranged that at the outer end of resistor 3 a voltage is available which is negative relative to the reference voltage at the above-mentioned junction point and at the output terminal 10, while at the outer end of the resistor 4 a voltage is available which is positive relative to the reference voltage mentioned above. These two negative and positive voltages have the same amplitude. A transistor 5 is provided the collector of which is connected with the outer end of resistor 3 so as to be supplied with negative voltage, while the base of the transistor is connected with a junction point between a resistor 6 and a capacitor 7 which together constitute an RC-circuit, the outer ends of which being connected with the negative and positive terminals, respectively, of the rectifier 2. A second RC-circuit composed of a resistor 8 and a capacitor 9 in series-connection is arranged between the emitter of the transistor 5 and the output terminal 10. The junction point between resistor 8 and capacitor 9 is taken to a second output terminal 10′ between which an output voltage $U_2$ is available in operation of this arrangement. The output voltage $U_2$ may be considered as representing a control signal which is applicable to the automatic volume control of an amplifier as discussed further above.

The operation of the arrangement is as follows: It may be assumed that the input voltage $U_1$ is an alternating current voltage of constant amplitude. Consequently a direct current voltage of constant amplitude is applied across the voltage divider or resistors 3, 4. Consequently, the capacitor 7 is charged via the resistor 6 to this direct current voltage of constant amplitude. Simultaneously a potential which is negative with respect to the emitter potential is applied via resistor 6 to the base of the transistor so that this transistor is in conductive condition. Consequently, the capacitor 9 is connected via resistor 8 and the emitter-collector circuit of transistor 5 with the negative potential available at the outer end of resistor 3. Thus the capacitor 9 is charged to this direct current potential. This situation is the starting condition for the operation of the arrangement.

If now the input alternating voltage $U_1$ increases abruptly to e.g. three times the previous value, then the direct current voltage across the resistors 3 and 4 likewise increases abruptly to three times the original value. However, the capacitor 7 retains at first its previous charge potential. The entire change of the direct current voltage appears as a voltage drop across the resistor 6 so that the base of the transistor 5 becomes positive relative to the emitter potential which is connected via resistor 8 with the capacitor 9 and therefore also retains like capacitor 9 its previous value, i.e. the charge potential of the capacitor 9. Consequently the transistor which was up to this moment conductive is now rendered non-conductive. Hereby the second RC-circuit comprising the resistor 8 and the capacitor 9, is disconnected from the input means furnishing direct current voltage. Therefore, the output voltage $U_2$ remains unchanged. However, during a time period depending upon the charging time constant of the RC-circuit 6, 7, the capacitor 7 is now charged through the resistor 6 up to a voltage available at the outer ends of the resistors 3 and 4. This is what develops during the first period of the delaying operation.

At the end of this first period the base of the transistor 5 becomes again negative with respect to the emitter potential so that the transistor is again rendered conductive. This constitutes the beginning of the second period of the operation since now the capacitor 9 is charged. After a period of time depending upon the charging time constant of the second RC-circuit 8, 9 the potential $U_2$ at the capacitor 9 reaches a value which corresponds to the direct current voltage available across the resistor 3. When this condition is obtained the second period of the operation is terminated.

Since the duration of the above-mentioned first and second periods of the operation depend on the charging time constant of the two RC-circuits, it is in many cases desirable to be able to vary the duration of these periods or at least of one of these periods. Therefore, it is in such cases advantageous to use as resistors 6 and 8, or at least one of them, a variable resistor whereby the respective time constant can be adjusted as desired.

It will be understood that each of the elements described above, or two or more together, may also find a useful application in other types of a circuit arrangement for delaying the charging of a capacitor differing from the types described above.

While the invention has been illustrated and described as embodied in an automatic regulating arrangement for delaying the application of an abrupt voltage change to the automatic volume control of an amplifier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A circuit arrangement for delaying the charging of a capacitor upon amplitude increase of the charging voltage, comprising, in combination, input means for introducing a direct current input voltage of predetermined normally constant amplitude but subject to amplitude increases; a main RC-circuit including the capacitor to be charged and having a first charging time constant and conductor means connecting said main RC-circuit with said input means; a secondary RC-circuit having a second charging time constant and including conductor means connecting said secondary RC-circuit with said input means; and circuit control means associated with said conductor means for automatically disconnecting said main RC-circuit from said input means during any increase of said input voltage above said normally constant amplitude until said secondary RC-circuit is charged by said increase of said input voltage, and for automatically connecting said main RC-circuit with said input means while the same furnishes said input voltage at said normally constant amplitude and at any time after said secondary RC-circuit has been charged by said increase of said input voltage, so that said capacitor to be charged is normally charged by and to said input voltage of predetermined normally constant amplitude, but is being charged up to an increased voltage during a time period depending upon said first charging time constant beginning only after said secondary RC-circuit has been charged up to said increased voltage during a time period depending on said second charging time constant.

2. A circuit arrangement for delaying the charging of a capacitor upon an abrupt increase of a charging direct current potential, comprising, in combination, main capacitor means; resistor means connected in series with said main capacitor means for establishing an RC-circuit having a predetermined first time constant for the charging of said main capaictor means; input means for introducing a direct current input voltage of a predetermined normally constant amplitude but subject to abrupt increases of said amplitude; circuit control means capable of being changed between conductive and non-conductive condition and connected between said input means and said RC-circuit for permitting the charging of said main capacitor means with said input voltage when said circuit control means is in conductive condition; a second RC-circuit comprising second resistor means and second capacitor means in series-connection and having a second time constant for the charging of said second capacitor means, said second RC-circuit being connected between said input means and said circuit control means for rendering, upon an abrupt increase of said input voltage to a comparatively high amplitude, said circuit control means non-conductive until said second capacitor means is charged by said input voltage, but rendering said circuit control means conductive while said input voltage is at said normally constant amplitude, so that said main capacitor means is normally charged to said input voltage of normally constant amplitude, but is being charged to said voltage of comparatively high amplitude during a time period depending upon said first time constant and beginning only after said second capacitor means has been charged during a period depending upon said second time constant.

3. Automatic regulating arrangement for delaying the application of an abrupt voltage change to the automatic volume control of an amplifier, particularly of an amplifier employed in the registration of seismic impulses, comprising, in combination, input means for introducing a direct current input voltage of a predetermined normally constant amplitude but subject to abrupt increases of said amplitude; voltage divider means connected with said input means for deriving from said input voltage a reference voltage at its center point, a more negative voltage at one end thereof and a more positive voltage at the other end thereof; a first series-combination of one resistor means and one capacitor means having a predetermined charging time constant and being connected across the ends of said voltage divider means; transistor means having a base, an emitter and a collector and having its collector connected to said one end of said voltage divider means and its base connected to a junction point between said first resistor and capacitor means; a second series-combination of another resistor means and another capacitor means having also a predetermined charging time constant and connected between said emitter of said transistor means and said center point of said divider means; and output means connected with said center point of said divider means and with a junction point between said second resistor and capacitor means respectively, for delivering a control signal corresponding to the charge voltage of said other capacitor means, so that said other capacitor means is normally charged to said input voltage of normally constant amplitude, but is being charged up to an increased voltage corresponding to an increase of said input voltage amplitude during a time period depending upon the time constant of said second series-combination, said time period beginning only after said one capaictor means has been charged up to said increased voltage during a period of time depending on said time constant of said first series-combination.

4. Automatic regulating arrangement for delaying the application of an abrupt voltage change to the automatic volume control of an amplifier, particularly of an amplifier employed in the registration of seismic impulses, comprising, in combination, input means for introducing a direct current input voltage of a predetermined normally constant amplitude but subject to abrupt increases of said amplitude; voltage divider means connected with said input means for deriving from said input voltage a reference voltage at its center point, a more negative voltage at one end thereof and a more positive voltage at the other end thereof; a first series-combination of one variable resistor means and one capacitor means having a variable charging time constant and being connected across the ends of said voltage divider means; transistor means having a base, an emitter and a collector and having its collector connected to said one end of said voltage divider means and its base connected to a junction point between said first resistor and capacitor means; a second series-combination of another resistor means and another capacitor means having also a predetermined charging time constant and connected between said emitter of said transistor means and said center point of said divider means; and output means connected with said center point of said divider means and with a junction point between said second means resistor and capacitor respectively, for delivering a control signal corresponding to the charge voltage of said other capacitor means, so that said other capacitor means is normally charged to said input voltage of normally constant amplitude, but is being charged up to an increased voltage corresponding to an increase of said input voltage amplitude during a time period depending upon the time constant of said second series-combination, said time period beginning only after said one capacitor means has been charged up to said increased voltage during a period of time depending on said adjusted time constant of said first series-combination.

5. Automatic regulating arrangement for delaying the application of an abrupt voltage change to the automatic volume control of an amplifier, particularly of an amplifier employed in the registration of seismic impulses, comprising, in combination, input means for introducing a direct current input voltage of a predetermined normally constant amplitude but subject to abrupt increases of said amplitude; voltage divider means connected with said input means for deriving from said input voltage a reference voltage at its center point, a more negative voltage at one end thereof and a more positive voltage at the other end thereof; a first series-combination of one variable resistor means and one capacitor means having a variable charging time constant and being connected across the ends of said voltage divider means; transistor means having a base, an emitter and a collector and having its collector connected to said one end of said voltage divider means and its base connected to a junction point between said first resistor and capacitor means; a second series-combination of another variable resistor means and another capacitor means having also a variable charging time constant and connected between said emitter of said transistor means and said center point of said divider means; and output means connected with said center point of said divider means and with a junction point between said second resistor and capacitor means respectively, for delivering a control signal corresponding to the charge voltage of said other capacitor means, so that said other capacitor means is normally charged to said input voltage of normally constant amplitude, but is being charged up to an increased voltage corresponding to an increase of said input voltage amplitude during a time period depending upon the adjusted time constant of said second series-combination, said time period beginning only after said one capacitor means has been charged up to said increased voltage during a period of time depending on said adjusted time constant of said first series-combination.

No references cited.